US007657942B2

(12) United States Patent
Himberger et al.

(10) Patent No.: US 7,657,942 B2
(45) Date of Patent: Feb. 2, 2010

(54) METHOD OF ASSURING ENTERPRISE SECURITY STANDARDS COMPLIANCE

(75) Inventors: Kevin David Himberger, Durham, NC (US); Clark Debs Jeffries, Chapel Hill, NC (US); Charles Steven Lingafelt, Durham, NC (US); Allen Leonid Roginsky, Durham, NC (US); Phillip Singleton, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1028 days.

(21) Appl. No.: 11/033,436

(22) Filed: Jan. 11, 2005

(65) Prior Publication Data

US 2006/0156408 A1 Jul. 13, 2006

(51) Int. Cl.
*H04L 29/14* (2006.01)
*G08B 23/00* (2006.01)
(52) U.S. Cl. ...................................................... 726/25
(58) Field of Classification Search ........................ None
See application file for complete search history.

(56) References Cited

U.S. PATENT DOCUMENTS

| | | | | |
|---|---|---|---|---|
| 6,226,372 | B1 | 5/2001 | Beebe et al. | 379/189 |
| 6,240,512 | B1 | 5/2001 | Fang et al. | 713/150 |
| 6,574,617 | B1 | 6/2003 | Immerman et al. | 707/1 |
| 6,606,708 | B1 | 8/2003 | Devine et al. | 713/201 |
| 6,971,026 | B1 * | 11/2005 | Fujiyama et al. | 726/25 |
| 7,096,502 | B1 * | 8/2006 | Fox et al. | 726/25 |
| 7,409,721 | B2 * | 8/2008 | Hernacki et al. | 726/25 |
| 2002/0188861 | A1 * | 12/2002 | Townsend | 713/200 |
| 2007/0016955 | A1 * | 1/2007 | Goldberg et al. | 726/25 |

OTHER PUBLICATIONS

"Information Security Risk Assessment—Practices of Leading Organizations", GAO, Nov. 1999, Retrieved from the Internet on Sep. 30, 2008: <URL: http://www.gao.gov/special.pubs/ai00033.pdf>.*
Stoneburner et al., "Risk Management Guide for Information Technology Systems", NIST, Jul. 2002, Retrieved from the Internet on Sep. 30, 2008: <URL: http://csrc.nist.gov/publications/nistpubs/800-30/sp800-30.pdf>.*
"CMS Information Security Risk Assessment (RA) Methodology", CMS, Sep. 2002, Retrieved from the Internet on Sep. 30, 2008: <URL: http://csrc.nist.gov/groups/SMA/fasp/documents/risk_mgmt/RA_meth.pdf>.*

(Continued)

*Primary Examiner*—Minh Dinh
(74) *Attorney, Agent, or Firm*—Yee & Associates, P.C.; Arthur J. Samodovitz (57) ABSTRACT

A method, apparatus, and computer instructions for providing a current and complete security compliance view of an enterprise system. The present invention provides the ability to gain a real-time security posture and security compliance view of an enterprise and to assess the risk impact of known threats and attacks to continued business operations at various levels is provided. Responsive to a change to an enterprise environment, a request, or an external threat, an administrator loads or updates at least one of a Critical Application Operations database, a Historical database, an Access Control database, a Connectivity database, and a Threat database. Based on a comparison of information in the databases against similar security data elements from company or external policies, the administrator may generate a Security Compliance view of the enterprise. A Security Posture view may also be generated by comparing the Security Compliance view against data in the Threat database.

7 Claims, 8 Drawing Sheets

OTHER PUBLICATIONS

Albert et al., "Operationally Critical Threat, Asset, and Vulnerability Evaluation (OCTAVE) Framework", Carnegie Mellon Univ., Jun. 1999, Retrieved from the Internet on Sep. 30, 2008: <URL: http://www.sei.cmu.edu/pub/documents/99.reports/pdf/99tr017.pdf>.*

Henning, "Security Service Level Agreements: Quantifiable Security for the Enterprise?", ACM Digital Library, 2000, pp. 54-60.

Medjahed et al., "Business-to-business interactions: issues and enabling technologies", The VLDB Journal (2003) 12: 59-85 / Digital Object Identifier (DOI) 10.1007/s00778-003-0087-z, pp. 59-70.

* cited by examiner

| 1202 ↘ SECURITY COMPLIANCE VIEW 1206 ↙ | |
|---|---|
| 1204 ↘ REQUIRED RESOURCE | COMPLIANT TO POLICY? |
| 1208 ↗ PS 4.3 | YES |
| 1210 ↗ WINDOWS 2K | YES |
| RTP LAN SWITCH | YES |
| SAN-43 | YES |
| ROOM ACCESS | YES |
| PROCEDURES | YES |
| OVERALL | |
| APPLICATION | YES |

| 1212 ↘ SECURITY POSTURE VIEW 1216 ↙ | |
|---|---|
| 1214 ↗ REQUIRED RESOURCE | CURRENT THREAT? |
| 1208 ↗ PS 4.3 | NO |
| 1210 ↗ WINDOWS 2K | YES |
| RTP LAN SWITCH | NO |
| SAN-43 | NO |
| ROOM ACCESS | NO |
| OVERALL | |
| APPLICATION | YES |

THREAT DATABASE  DB6

| THREATS | RESOURCE CLASS 1408 | PHYSICAL RESOURCE | | | LOGICAL RESOURCE | | | | SECURITY ASSESSMENT TOOLS | | |
|---|---|---|---|---|---|---|---|---|---|---|---|
| | | ROOM | MACHINE | OPERATING SYSTEM | APPLICATION | NETWORK | DATA | | IDS DETECTABLE | HEALTH CHECKING | ANTI-VIRUS DETECTABLE |
| SLAMMER | FINANCIAL APPLICATION | NO | NO | YES WIN2K | NO | NO | NO | | YES | VULNERABILITY #4 | NO |
| NUKEM | SAN | NO | NO | NO | NO | NO | YES | | NO | VULNERABILITY #8 | NO |

1404, 1406, 1409, 1410, 1413, 1402, 1411

ACCESS CONTROL DATABASE  DB3  1415

| RESOURCE CLASS | PHYSICAL ACCESS | | | LOGICAL ACCESS | | | | SECURITY ASSESSMENT TOOLS | | |
|---|---|---|---|---|---|---|---|---|---|---|
| | ROOM | MACHINE | OPERATING SYSTEM | APPLICATION | NETWORK | DATA | | IDS | HEALTH CHECKING | ANTI-VIRUS |
| FINANCIAL APPLICATION | NA | NA | WIN2K | HR | SP 2 | DISK G | | NONE | VULNERABILITY #4 VULNERABILITY #5 | CURRENT |
| SAN | RTP-A3 | Disk4 | SAN4 | PS, SAP, HR | MAINTENANCE-4, BACKUP-3 | ALL | | NONE | VULNERABILITY #9 | NA |

| REQUIRED RESOURCE | PS 4.3 | SAN-43 |
|---|---|---|

THREAT RESULT  DB7  1414, 1417, 1412, 1416

| THREATENED RESOURCE | RESOURCE CLASS | PHYSICAL RESOURCE | | | LOGICAL RESOURCE | | | SECURITY ASSESSMENT TOOLS | | |
|---|---|---|---|---|---|---|---|---|---|---|
| | | ROOM | MACHINE | OPERATING SYSTEM | APPLICATION | NETWORK | DATA | IDS DETECTABLE | HEALTH CHECKING | ANTI-VIRUS DETECTABLE |
| PS 4.2 | FINANCIAL APPLICATION | NO | NO | YES | NO | NO | NO | YES | VULNERABILITY #4 | NO |
| SAN-43 | SAN | NO | NO | NO | NO | NO | YES | NO | VULNERABILITY #8 | NO |

THREAT DATABASE "AND" ACCESS CONTROL DATABASE → THREAT RESULT

METHOD OF ASSURING ENTERPRISE SECURITY STANDARDS COMPLIANCE

BACKGROUND OF THE INVENTION

1. Technical Field

The present invention is directed to an improved data processing system. More specifically, the present invention relates to a method, apparatus, and computer instructions for providing a current and complete security compliance view of an entire enterprise system for analysis of risks to business operations.

2. Description of Related Art

Businesses need a simplified way to ascertain their security posture across the enterprise. The security posture of an organization is usually seen as compliance to internal security policies, procedures, and measures. To assess and measure an organization's security compliance, data is collected from various measurement sources; the sources typically housed in different repositories and databases. This collected data is usually created, analyzed, viewed, and interpreted by various security teams and administrators for possible actions, workflows, or reports. Senior management is then informed of the organization's security posture based on the generated reports. However, much time, money, and energy is expended to generate and interpret this data. Additionally, this data collecting, analyzing, and reporting process is usually repeated over a daily, weekly, quarterly, semi-annual, and annual basis. This repeatable process costs most organizations a great deal of time, money, and effort to perform. Furthermore, the information that flows to management is subject to interpretation, usually does not provide a true enterprise security posture, and rarely is timely.

Figure 1A:
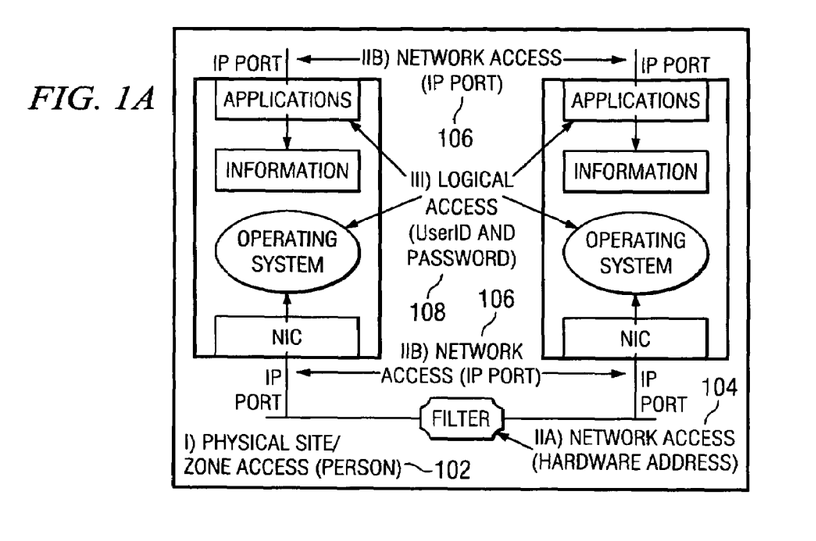
FIGS. 1A and 1B depict a known simple network housing information.

FIG. 1A shows a known simple network housing information. In particular, FIG. 1A illustrates how access to various enterprise components is currently granted and security compliance is measured. Security practices are typically grouped into categories that measure compliance against physical, network, and logical controls. It should be noted that a key is required for each access step shown in FIG. 1A. In addition, as each access granted leaves a footprint, a historical log of the access activity is created and is part of the data used to perform security health checking. Current device configuration data is also used in security health checking and assessments.

As shown in FIG. 1A, physical access is first granted to an individual, wherein the access is granted per identity (step 102). Network access is then granted for devices, the access granted per hardware address (step 104). Next, network access granted for devices, the access granted per IP address and ports (step 106). Finally, logical access to the system's applications and operating systems is granted for individuals or machines, the access granted per userID and password (step 108).

Figure 1B:
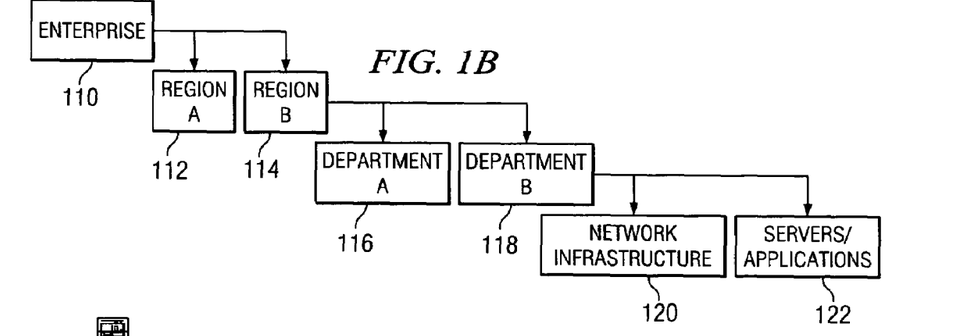

Typically, the gathered measurement data for each security practices category in FIG. 1A is further divided into regional, sectional, or departmental domains, as shown in FIG. 1B. For example, a security practices category in enterprise 110 is divided into two or more regions, such as region A 112 and region B 114. A region may also be separated into multiple departments, such as department A 116 and department B 118. Each department may be further divided into separate domains, such as network infrastructure 120 and servers/applications 122. As a great deal of human effort is already needed to run scripts and tools, await the output, analyze the data, and then provide reports to management, further effort is expended to provide the piece meal enterprise-wide compliance posture as illustrated in FIG. 1B.

Presently, there is no consolidated real-time method to gain an enterprise-wide view of the security posture of an organization. Many organizations depend on security compliance checklists, self-assessment databases, audits, and multivendor security assessment tools. However, this data is usually in the form of snapshot or historical data that at-best shows the near current security compliance posture of a subset of vendor devices and of the various parts of the enterprise. Also, the data neither conveys enterprise security readiness, nor a synopsis of the impending impact of various threats and vulnerabilities to operations if exploited.

In addition, key security, business control, and executive personnel must depend on security information collected by humans and vendor tools to determine the compliance posture of their enterprise. As this collected security information in the form of varied documents, device output files, and assessment tool reports is reviewed and analyzed to convey a departmental, organizational, and enterprise-wire security posture, the historical data is subject to various human interpretations.

Therefore, it would be advantageous to have a mechanism that provides the ability for security, technical, executive, and business control personnel to gain a real-time security posture and security compliance view of the enterprise and to assess the risk impact of known threats and attacks to continued business operations at various levels.

SUMMARY OF THE INVENTION

The present invention provides a method, apparatus, and computer instructions for providing a current and complete security compliance view of an enterprise system. Using the mechanism of the present invention, the ability to gain a real-time security posture and security compliance view of an enterprise and to assess the risk impact of known threats and attacks to continued business operations at various levels is provided. Responsive to a change to an enterprise environment, an administrator loads or updates at least one of a Critical Application Operations database, a Historical database, an Access Control database, a Connectivity database, and a Threat database. Based on a comparison of information in the databases against similar security data elements from company or external policies, the administrator may generate a Security Compliance view/report of the entire enterprise or critical portions of the enterprise. A Security Posture view/report may also be generated by comparing the Security Compliance view against data in the Threat database.

The present invention also allows for generating a Threat Result view/report to determine the impact to enterprise operations if a threat is exploited. The Threat Result view/report is created using an algorithm to compare elements in the Threat database against data in the Access Control database. In addition, data from the Threat Result view/report may be compared against elements in the Connectivity database to create a Resource Exposure view/report. The Resource Exposure view/report allow for identifying other resources that are at risk by virtue of their connection to a vulnerable critical business operation.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 14 shows an example flow of data elements to produce a threat result view/report in accordance with the present invention;

DETAILED DESCRIPTION OF THE PREFERRED EMBODIMENT

Figure 2:
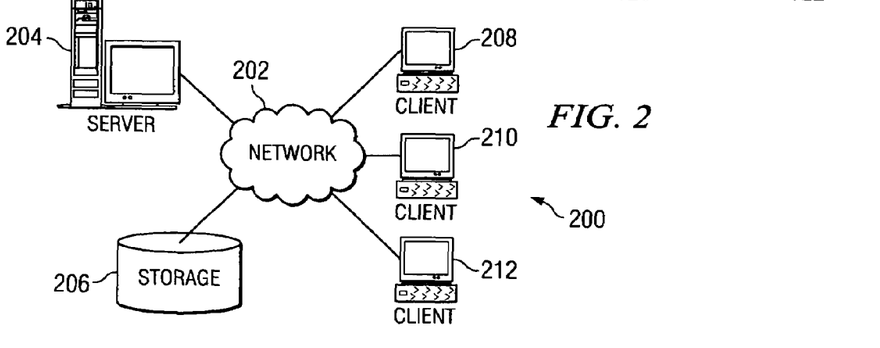
FIG. 2 depicts a representation of a network of data processing systems in which the present invention may be implemented.

With reference now to the figures, FIG. 2 depicts a pictorial representation of a network of data processing systems in which the present invention may be implemented. Network data processing system 200 is a network of computers in which the present invention may be implemented. Network data processing system 200 contains a network 202, which is the medium used to provide communications links between various devices and computers connected together within network data processing system 200. Network 202 may include connections, such as wire, wireless communication links, or fiber optic cables.

In the depicted example, server 204 is connected to network 202 along with storage unit 206. In addition, clients 208, 210, and 212 are connected to network 202. These clients 208, 210, and 212 may be, for example, personal computers or network computers. In the depicted example, server 204 provides data, such as boot files, operating system images, and applications to clients 208-212. Clients 208, 210, and 212 are clients to server 204. Network data processing system 200 may include additional servers, clients, and other devices not shown. In the depicted example, network data processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 200 also may be implemented as a number of different types of networks, such as for example, an intranet, a local area network (LAN), or a wide area network (WAN). FIG. 2 is intended as an example, and not as an architectural limitation for the present invention.

Figure 3:
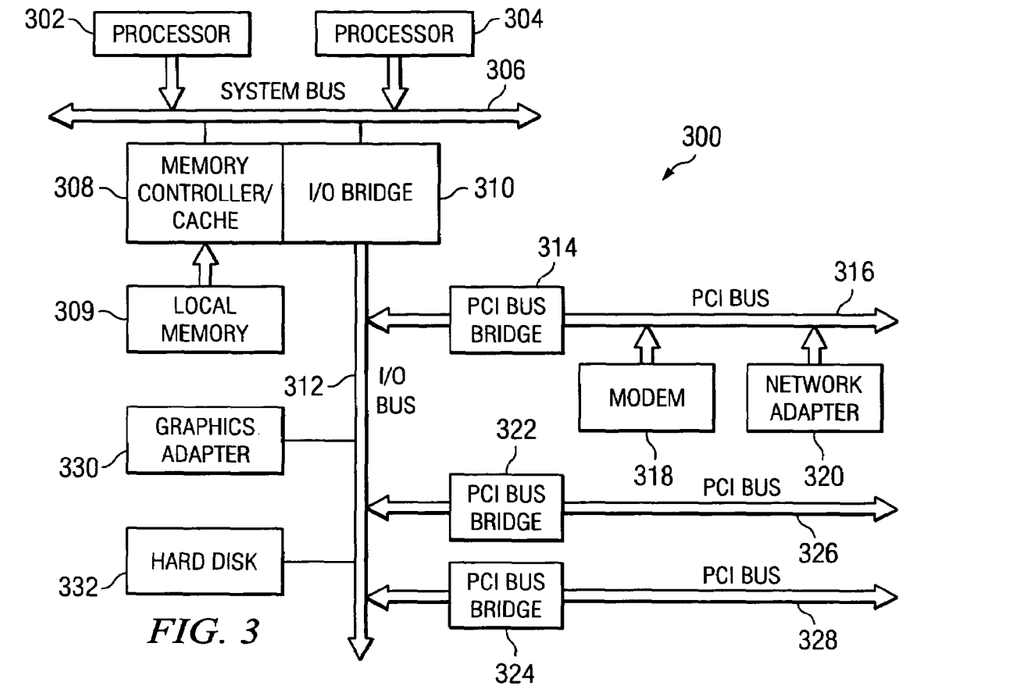
FIG. 3 is a block diagram of a data processing system that may be implemented as a server in accordance with a preferred embodiment of the present invention.

Referring to FIG. 3, a block diagram of a data processing system that may be implemented as a server, such as server 204 in FIG. 2, is depicted in accordance with a preferred embodiment of the present invention. Data processing system 300 may be a symmetric multiprocessor (SMP) system including a plurality of processors 302 and 304 connected to system bus 306. Alternatively, a single processor system may be employed. Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted.

Peripheral component interconnect (PCI) bus bridge 314 connected to I/O bus 312 provides an interface to PCI local bus 316. A number of modems may be connected to PCI local bus 316. Typical PCI bus implementations will support four PCI expansion slots or add-in connectors. Communications links to clients 208-212 in FIG. 2 may be provided through modem 318 and network adapter 320 connected to PCI local bus 316 through add-in connectors.

Additional PCI bus bridges 322 and 324 provide interfaces for additional PCI local buses 326 and 328, from which additional modems or network adapters may be supported. In this manner, data processing system 300 allows connections to multiple network computers. A memory-mapped graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 3 may be, for example, an IBM eServer pSeries system, a product of International Business Machines Corporation in Armonk, N.Y., running the Advanced Interactive Executive (AIX) operating system or LINUX operating system.

Figure 4:
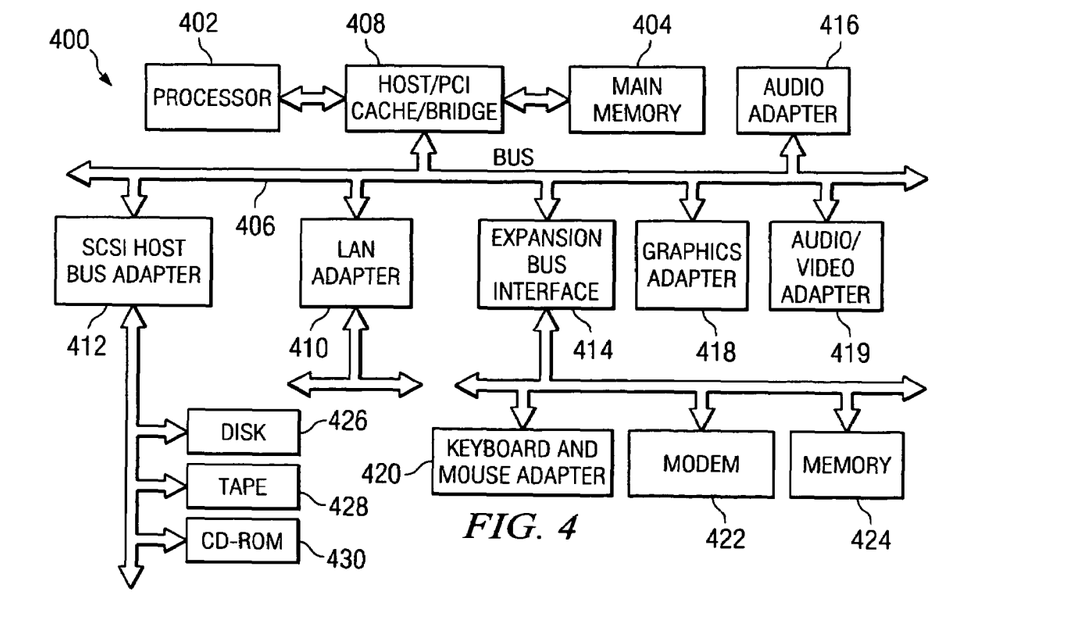
FIG. 4 is a block diagram illustrating a data processing system in which the present invention may be implemented.

With reference now to FIG. 4, a block diagram illustrating a data processing system is depicted in which the present invention may be implemented. Data processing system 400 is an example of a client computer. Data processing system 400 employs a peripheral component interconnect (PCI) local bus architecture. Although the depicted example employs a PCI bus, other bus architectures such as Accelerated Graphics Port (AGP) and Industry Standard Architecture (ISA) may be used. Processor 402 and main memory 404 are connected to PCI local bus 406 through PCI bridge 408. PCI bridge 408 also may include an integrated memory controller and cache memory for processor 402. Additional connections to PCI local bus 406 may be made through direct component interconnection or through add-in boards. In the depicted example, local area network (LAN) adapter 410, small computer system interface (SCSI) host bus adapter 412, and expansion bus interface 414 are connected to PCI local bus 406 by direct component connection. In contrast, audio adapter 416, graphics adapter 418, and audio/video adapter 419 are connected to PCI local bus 406 by add-in boards inserted into expansion slots. Expansion bus interface 414 provides a connection for a keyboard and mouse adapter 420, modem 422, and additional memory 424. SCSI host bus adapter 412 provides a connection for hard disk drive 426, tape drive 428, and CD-ROM drive 430. Typical PCI local bus implementations will support three or four PCI expansion slots or add-in connectors.

An operating system runs on processor 402 and is used to coordinate and provide control of various components within data processing system 400 in FIG. 4. The operating system may be a commercially available operating system, such as Windows XP, which is available from Microsoft Corporation. An object oriented programming system such as Java may run in conjunction with the operating system and provide calls to the operating system from Java programs or applications executing on data processing system 400. "Java" is a trademark of Sun Microsystems, Inc. Instructions for the operating system, the object-oriented programming system, and applications or programs are located on storage devices, such as hard disk drive 426, and may be loaded into main memory 404 for execution by processor 402.

Those of ordinary skill in the art will appreciate that the hardware in FIG. 4 may vary depending on the implementation. Other internal hardware or peripheral devices, such as flash read-only memory (ROM), equivalent nonvolatile memory, or optical disk drives and the like, may be used in addition to or in place of the hardware depicted in FIG. 4. Also, the processes of the present invention may be applied to a multiprocessor data processing system.

As another example, data processing system 400 may be a stand-alone system configured to be bootable without relying on some type of network communication interfaces. As a further example, data processing system 400 may be a personal digital assistant (PDA) device, which is configured with ROM and/or flash ROM in order to provide non-volatile memory for storing operating system files and/or user-generated data.

The depicted example in FIG. 4 and above-described examples are not meant to imply architectural limitations. For example, data processing system 400 also may be a notebook computer or hand held computer in addition to taking the form of a PDA.

The present invention provides security, technical, managerial, and executive-level personnel with an up-to-date enterprise-wide view of the security posture and security compliance of an organization. The mechanism of the present invention allows for consolidating varied enterprise security data and using near real-time security assessment data to show an enterprise-wide security posture. This varied enterprise security data is consolidated into one source, such as a centralized database, to allow personnel to request a security compliance view of the entire enterprise or critical portions of the enterprise. This security compliance information is correlated in or near real-time.

Additionally, the mechanism of the present invention provides an algorithm that allows personnel to gain an understanding of the risks and impact to business operations if various threats or vulnerabilities are exploited. The algorithm is used to assess the current threats against the current security compliance status and to provide specific reports on the possible risk impact to operations if a threat is exploited. The impact to operations is shown in real-time, based on the current physical, logical, and network environment.

Through the present invention, business organizations are provided with another weapon to use in prioritizing their mitigation and defense strategies regarding security threats and hacking attempts. Although gathering security data into a single source and producing a report is known in the art, the mechanism of the present invention provides an advantage over the prior art in that the present invention allows for consolidating all related security data and using real-time security assessment data to show an enterprise-wide security posture. In addition, although it is known that current threats and vulnerabilities may be assessed against current security posture, the present invention improves upon the prior art by allowing this assessment to show the impact to operations if the threats or vulnerabilities are exploited. Using the mechanism of the present invention, much time and expense would be saved in analyzing current security compliance of an organization, in providing critical security information to management, and in preparing a focused and informed defense against numerous security threats and attacks. In this manner, automated collection of current information of the present invention allows for reducing security operations, analysis, and mitigation costs.

Figure 5A:
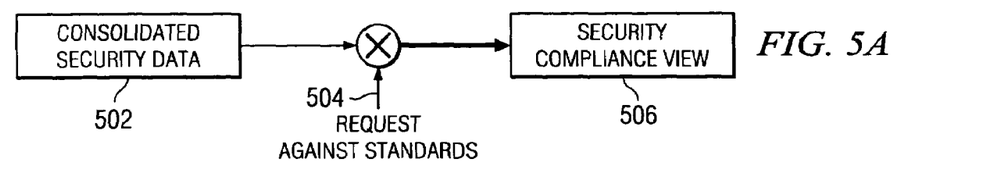
FIGS. 5A is a block diagram illustrating a request for a Security Compliance view of the enterprise in accordance with the present invention.

Turning now to FIGS. 5A-5D, block diagrams illustrating an overview of the present invention are shown. In particular, FIG. 5A is a block diagram illustrating a request for a security compliance view of the entire enterprise or critical portions of the enterprise in accordance with the present invention. The Security Compliance View shows the portions of the enterprise that are (or are not) in compliance with industry or corporate physical, logical, and network security standards. Here, logical security includes device configuration parameters and the associated testing and tools used for verification. Security compliance information from the enterprise is combined into one source, such as a centralized database, to form consolidated security data 502. This security compliance information may be obtained from various sources, such as from checklists, databases, audits, devices, and security assessment tools. Security, technical, managerial, and executive-level personnel may then issue a request against standards 504 to obtain a near real-time security compliance view 506 of the entire enterprise or critical portions of the enterprise.

Figure 5B:
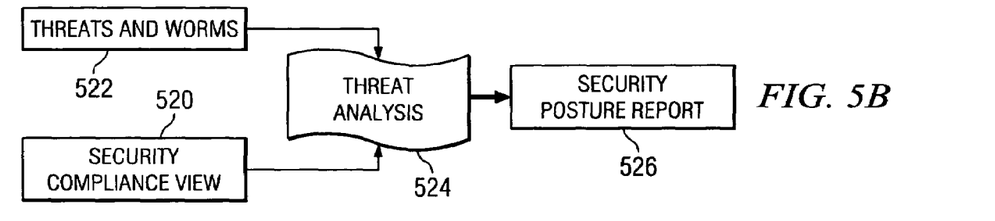
FIG. 5B is a block diagram illustrating an algorithm for assessing the current threats against the current security compliance status in accordance with the present invention.

In addition to allowing personnel to obtain an enterprise-wide view of security compliance, the present invention also allows for using the enterprise-wide view of security compliance to analyze risks to business applications and operations, as shown in FIG. 5B. FIG. 5B is a block diagram illustrating an algorithm for assessing the current threats against the current security compliance status in accordance with the present invention. Threat analysis algorithm 524 pulls data from Security Compliance view 520 and threats and worms data 522 to generate specific Security Posture view 526. The Security Posture view shows the portions of the enterprise that are (or are not) susceptible to a current security threat. It should be noted that it is possible to have full security compliance to a standard and be susceptible to a current security threat. Based on the threat analysis performed against the current security compliance settings, Security Posture view 526 provides personnel with the security posture of the enterprise.

Figure 5C:
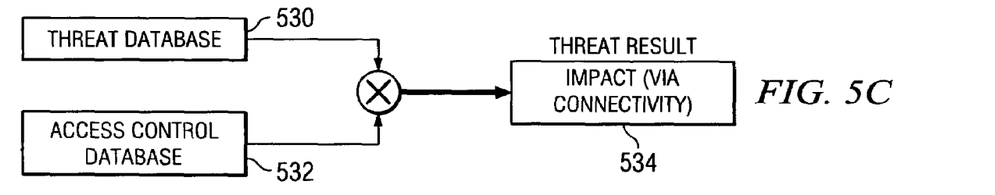
FIG. 5C is a block diagram illustrating the risk impact the security compliance information may have on continued business operations in the enterprise in accordance with the present invention.

Furthermore, FIG. 5C is a block diagram illustrating the risk impact the security compliance information may have on continued business operations in the enterprise in accordance with the present invention. Information in Threat database 530 and Access Control database 532 are correlated in or near real-time and are compared to provide Threat Result view 534. Threat Result view 534 provides information to an administrator regarding the possible risk impact to critical business applications and operations if existing threats and system vulnerabilities are exploited.

Figure 5D:
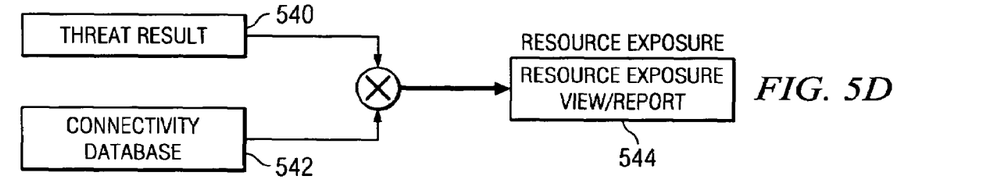
FIG. 5D is a block diagram illustrating the resource exposure in the enterprise in accordance with the present invention.

FIG. 5D is a block diagram illustrating the resource exposure in the enterprise in accordance with the present invention. Information from Threat Result view 540 and elements in Connectivity database 542 are correlated in or near real-time and are compared to provide Resource Exposure view 544. Connectivity information is pulled from the configuration files of each device in the enterprise and stored in Connectivity database 542. Connectivity database 542 shows the network connectivity between the devices shown in FIG. 2. Resource Exposure view 544 shows all of the enterprise devices and the associated business applications/operations that would be affected should a threat be exploited. In essence, this view shows the possible ripple effects of an exploit.

Figure 6:
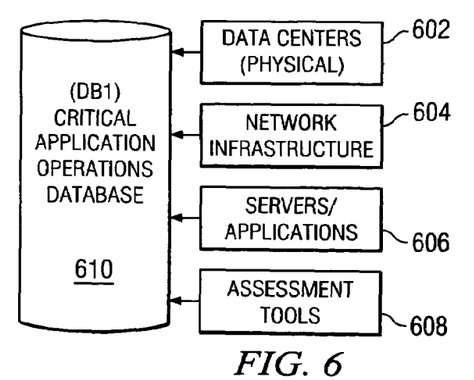
FIG. 6 is a block diagram illustrating how critical business application operations are identified and mapped in accordance with the present invention.

FIGS. 6-11 depict an exemplary embodiment of the present invention, which is implemented in four phases. FIG. 6, depicting the first phase of the particular embodiment, is a block diagram illustrating how critical business application operations are identified and mapped in accordance with the present invention. When assessing the current threats against the current security compliance status as described above in FIG. 5B, the enterprise network and associated devices (and applications) are mapped based on criticality, or importance to the business organization. This mapping is achieved by first identifying and ranking critical operations according to business priorities. Critical business application operations are then mapped to supporting data centers 602, network infrastructure 604, servers/applications 606, and security assessment tools 608. Every specific data center, network device, server, application, and security assessment tool supporting the critical application/operation will be identified and stored in a database, such as Critical Application Operations database (DB1) 610.

Figure 7:
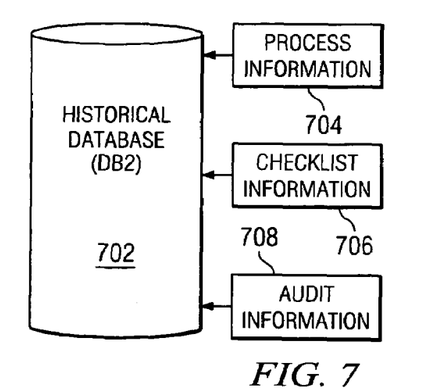
FIG. 7 is a block diagram illustrating how a database is populated with historical information in accordance with the present invention based on the mappings in FIG. 6.

Turning now to FIG. 7, a block diagram illustrating how historical data is populated into a database in accordance with the present invention based on the mappings in FIG. 6 is shown. FIG. 7, depicting the second phase of the particular embodiment, illustrates populating Historical database (DB2) 702 with enterprise data, such as security process data 704, security checklist data 706, and audit data 708. Historical database (DB2) 702 is populated based on the mapped supporting locations devices and security assessment tools. The enterprise data may include information regarding access to physical space and logical/network devices, along with security assessment tools supporting these critical operations.

Figure 8:
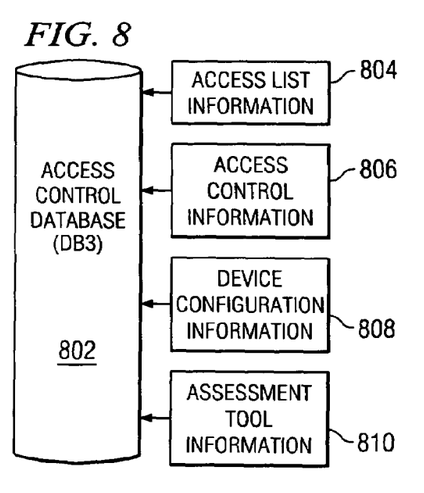
FIG. 8 is a block diagram illustrating how a database is populated with access control information in accordance with the present invention based on the mappings in FIG. 6.

FIG. 8 is a block diagram illustrating how a database is populated with real-time device information in accordance with the present invention based on the mappings in FIG. 6. FIG. 8, depicting the third phase of the particular embodiment, illustrates populating Access Control database (DB3) 802 with information regarding a resource in the enterprise, as well as who has access to this resource. Access Control database (DB3) 802 is populated with current access list information 804, which includes physical access data for critical business operations of the enterprise. In the similar manner, Access Control database (DB3) 802 is populated with access control information 806, which includes logical device access data for critical operations. Likewise, Access Control database (DB3) 802 is also populated with device configuration information 808, comprising security setting data and security assessment tool information 810, including security assessment tool output data for critical business operations of the enterprise.

Figure 9:
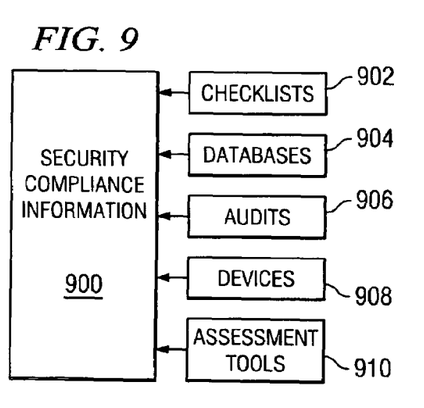
FIG. 9 is a block diagram illustrating a Security Compliance view in accordance with the present invention.

FIG. 9 is a block diagram illustrating security compliance information in accordance with the present invention. Security compliance information 900 is comprised of information gathered from various sources throughout the enterprise. For example, information gathered from checklists 902, databases 904, audits 906, devices 908, and security assessment tools 910 may comprise security compliance information 900. This gathered information supplies the data for Historical database (DB2) 702 in FIG. 7 and Access Control database (DB3) 802 in FIG. 8.

Figure 10:
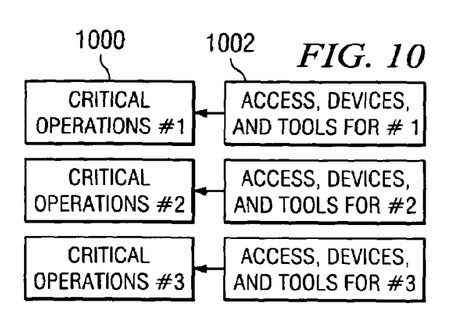
FIG. 10 is a block diagram illustrating the mapping of critical operations to data in accordance with the present invention.

FIG. 10 is a block diagram illustrating the mapping of critical operations to data in accordance with the present invention. Information regarding each critical operation identified as described above in FIG. 6, such as critical operation 1000, has associated access, device, and tools data 1002. This access, device, and security assessment tools information is provided to Critical Application Operations database (DB1) 610, in addition to the connectivity information for each resource.

Figure 11A:
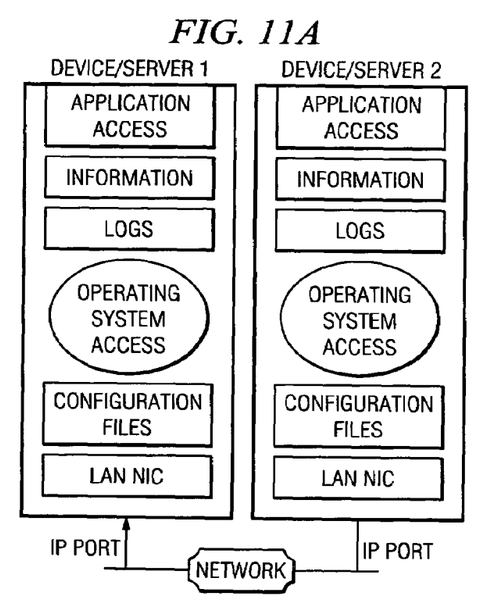
FIG. 11A is a diagram illustrating device access and configuration information in accordance with the present invention.

Turning next to FIG. 11A, a diagram illustrating device access and configuration information in accordance with the present invention is shown. Information in each device or server in the enterprise, rather than only subset of vendor devices or part of the enterprise, is used to provide an enterprise-wide view of the security posture of an organization. For example, a device or server, such as Device/Server 1 1100, provides specific device access, log, and configuration file information that is used in Critical Application Operations database (DB1) (log data for security assessment tool information 608 in FIG. 6) and in Access Control database (DB3) (access control information 806 and device configuration information 808 in FIG. 8).

Figure 11B:
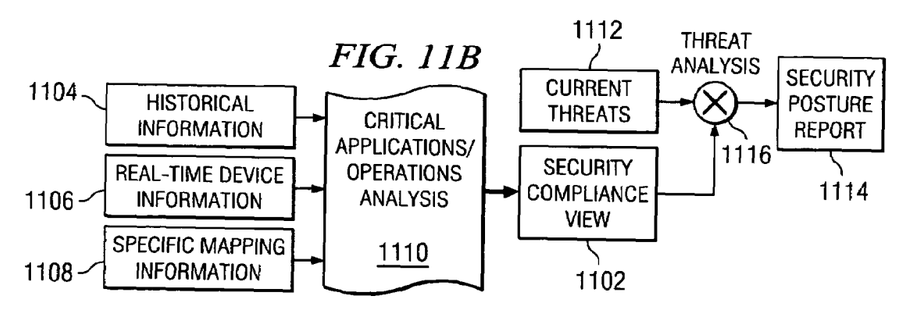
FIG. 11B is a block diagram illustrating a security compliance/posture in accordance with the present invention.

FIG. 11 B is a block diagram illustrating a security compliance/posture in accordance with the present invention is shown. FIG. 11B, depicting the fourth phase of the particular embodiment, illustrates how a security or business controls manager/executive may view the security compliance or security posture of the enterprise. Security Compliance view 1102 pulls three types of data—historical process data 1104; real-time physical and logical access, security scan, and configuration data 1106; and critical application mapping support data 1108. Critical application/operations data 1108 specifies the devices and location for which historical and real-time data is pulled. Critical application/operations data 1108 is obtained from Critical Application Operations database (DB1) 610 in FIG. 6. Historical process data 1104 is obtained from Historical database (DB2) 702 in FIG. 7. Real-time physical and logical access, security scan, and configuration data 1106 is obtained from Access Control database (DB3) 802 in FIG. 8. Historical process data 1104; real-time physical and logical access, security scan, and configuration data 1106; and critical application mapping support data 1108 are consolidated, and analysis 1110 is performed on this consolidated critical application and operation information to generate security compliance view 1102.

Current Threat database 1112 contains the latest security threat and vulnerability information for the enterprise. Once Security Compliance view 1102 is obtained, Security Posture report 1114 pulls data from Security Compliance view 1102 and current Threat database 1112. Security Posture report 1114 uses an algorithm to perform threat analysis 1116 based on the information pulled from Security Compliance view 1102 and current Threat database 1112. The threat analysis is used to assess the current threats against the current compliance settings of the enterprise and to provide specific reports on the possible risk impact to operations if various threats or vulnerabilities are exploited. Security Posture report 1114 shows the risks and impact to business operations in real-time, based on the current physical, logical, and network environment.

Figure 12:
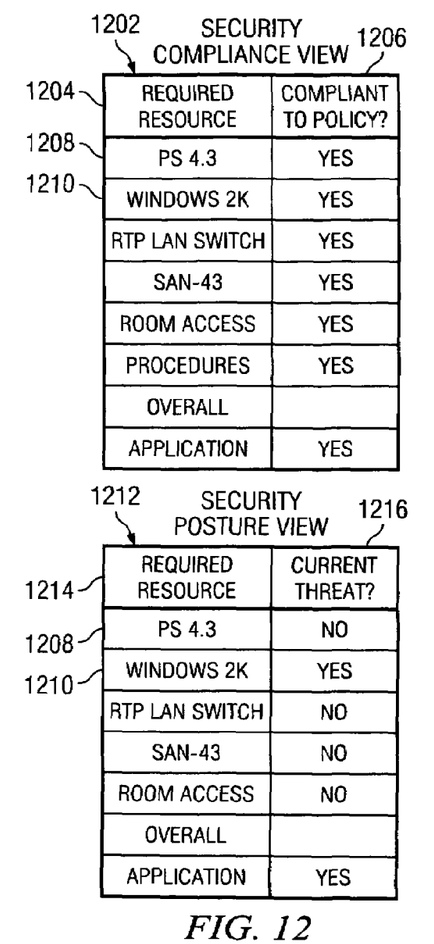
FIG. 12 is an example security compliance/posture based on a comparison of information in the databases against similar security data elements from the company or external policies in accordance with the present invention.

FIG. 12 provides an example security compliance/posture based on a comparison of information in the databases against similar security data elements from the company or external policies in accordance with the present invention. Security Compliance view 1202 includes a required resource field 1204 and a policy compliance field 1206. For each required resource, such as PS 4.3 1208 or Windows 2K 1210, an administrator may determine from Security Compliance view 1202 whether the particular resource is compliant with company or external policies. As shown, both PS 4.3 1208 or Windows 2K 1210 are compliant. Security Posture view 1212 includes a required resource field 1214 and a current threat field 1216. An administrator may determine from Security Posture view 1212 whether the particular resource is vulnerable to a current threat. For example, PS 4.3 1208 is shown not to be vulnerable to any current threat. However, as shown in current threat field 1216, there is a current threat against the Windows 2K 1210 resource. As a result, the administrator may take action to address the threat against the Windows 2K 1210 resource before the threat is exploited.

Figure 13:
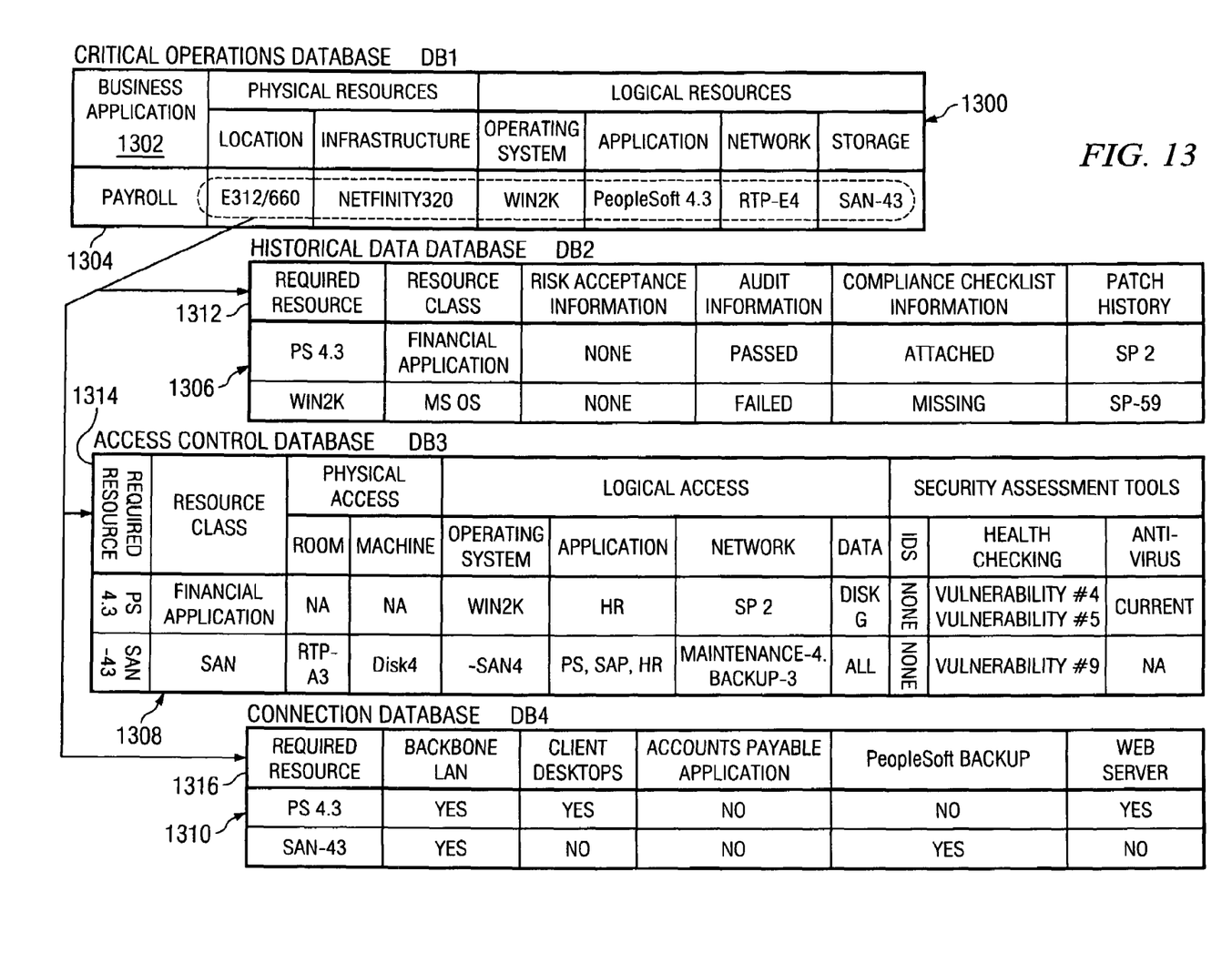
FIG. 13 shows an example of critical operations, historical, access connection, and connectivity database elements in accordance with the present invention.
Figure 15:
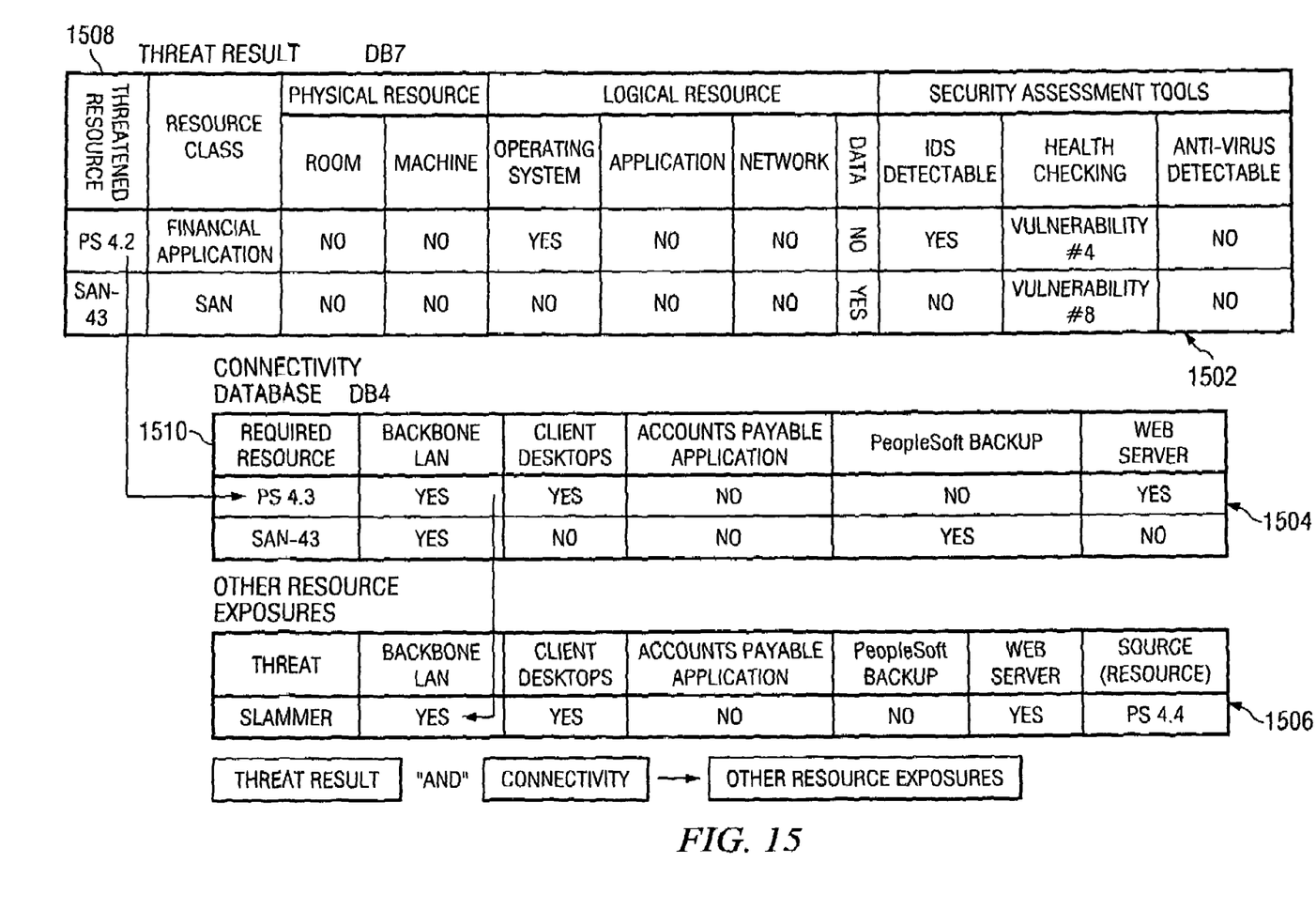
FIG. 15 shows an example flow of data elements used to produce an exposure view/report in accordance with the present invention.

Turning now to FIGS. 13, 14, and 15, relational databases are shown which contain key fields that allow relationships among data elements to be analyzed and to generate informational reports/enterprise security views. In particular, FIG. 13 provides an example of critical operations, historical, access connection, and connectivity database elements and their associated relationships in accordance with the present invention. These databases elements, which are contained in previously described databases Critical Application Operations database (DB1) 610 in FIG. 6, Historical database (DB2) 702 in FIG. 7, and Access Control database (DB3) 802 in FIG. 8, supply information needed to generate a Security Compliance view of critical business operations in the enterprise.

Critical Operations database (DB1) 1300 shows an example critical operation application and its associated high level physical, logical and network parameters. The key field in Critical Operations database (DB1) 1300 is Business Applications field 1302, and the shown data element is Payroll 1304. The next database shown in FIG. 13 is Historical database (DB2) 1306, which comprises the associated historical data for each resource that supports the particular business application, such as Payroll 1304. For example, the historical security compliance and audit status for each resource supporting the business application is shown. The key field in Historical database (DB2) 1306 is Required Resource field 1312. The data in Historical database (DB2) 1306 is used to make sure the proper controls are in place for business application and is used to determine if the business application is in compliance (e.g., system patches are up-to-date).

Access Control database (DB3) 1308 comprises the associated physical and logical access parameters for each resource. Access Control database (DB3) 1308 also provides the associated security assessment tools for each resource. The key field in Access Control database (DB3) 1308 is Required Resource field 1314. Access Control database (DB3) 1308 is used to determine whom has access to system resources used by a particular critical operation. Finally, Connectivity database (DB4) 1310 shows the interconnections between the resources supporting the critical operation and other resources throughout the enterprise. In other words, the relationship between each resource and the other resources that the resource may connect to over the network is shown. Connectivity database (DB4) 1310 also comprises the access allowed and security compliance tool status for each resource. The key field in Connectivity database (DB4) 1310 is Required Resource field 1316.

FIG. 14 shows an example flow of data elements to produce a threat result view/report in accordance with the present invention. These databases elements, which are contained in previously described databases Threat database (DB6) 1112 in FIG. 11 and Access Control database (DB3) 802 in FIG. 8, supply information needed to generate the threat result view or report.

Threat database (DB6) 1402 contains current threats against the enterprise. Threat database (DB6) 1402 shows an example of two current threats, Slammer 1404 and Nukem 1406. Resource class 1408 in threat database (DB6) 1402 includes the business operations that may be affected by each threat. As shown, Slammer 1404 may affect financial applications in the enterprise, and Nukem 1406 may affect the storage area network (SAN).

Threat database (DB6) 1402 also provides information regarding how a threat may affect each resource from a physical resource 1409, Logical Resource 1410, and Security Assessment Tool 1411 viewpoint. The key field in Threat database (DB6) 1402 is Logical Access 1410, OS 1413. In Threat database (DB6) 1402, the threat relationship between each resources class 1408 and a particular threat is determined based on the OS. As shown in resource class 1408, Slammer 1404 only affects the Financial application. However, in Access Control database (DB3) 1412, the Financial application is shown in logical access 1415 to be a part of the Human Resources application, which is on a machine on the SP2 Network. As a database "join" between Threat database (DB6) 1402 and Access Control database (DB3) 1412 is performed, the resulting database, Threat Result database (DB7) 1414, shows which logical resources 1416 are affected by the threat and which security assessment tools 1417 can detect this threat.

FIG. 15 shows an example flow of data elements used to produce an exposure view/report in accordance with the present invention. The exposure report in FIG. 15 is used to determine the exposure that other resources may face if a threat to a particular critical operation is exploited. The exposure view/report pulls information from Threat result database (DB7) 1502 and Connectivity database (DB4) 1504 to generate Other Resource Exposure view 1506.

Threat result database (DB7) 1502 has a key field of Threatened Resource 1508, which contains the same data as the Required Resource key field 1510 in Connectivity database (DB4) 1504. As previously mentioned, Connectivity database (DB4) 1504 shows the other networks and devices that connect to the threaten resources identified in Threat result database (DB7) 1502. As a database "join" between Threat result database (DB7) 1502 and Connectivity database (DB4) 1504 is performed, Other Resource Exposure view 1506 provides the other resources in the enterprise which may also be threatened via network and device connections.

Figure 16:
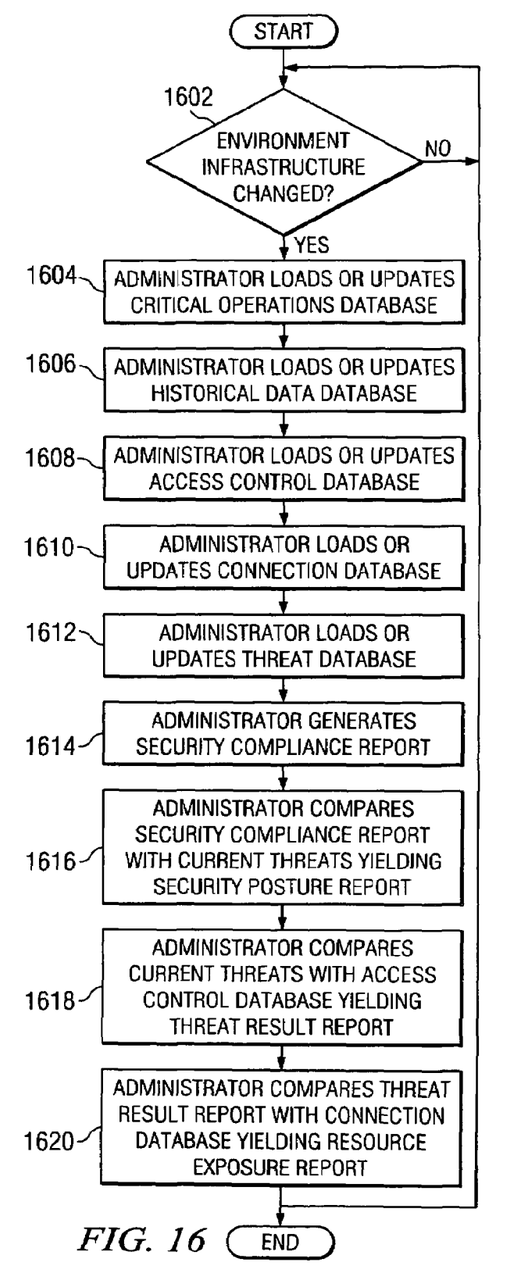
FIG. 16 is a flowchart of a process for arriving at an enterprise security compliance assessment and security posture in accordance with the present invention.

Turning now to FIG. 16, a flowchart of a process for arriving at an enterprise security compliance assessment and security posture in accordance with a preferred embodiment of the present invention is shown. Prior to implementing the process in FIG. 16, the critical operations, historical, access control, network connection, and threat databases may be populated with the necessary data elements from industry data and company records, databases, and standards as described in FIGS. 6-11. The process described in FIG. 16 is triggered or repeated whenever there is a change to identified elements in the internal or external environment.

The process begins with an administrator determining whether there has been a change in any of the information in the security compliance databases or to company policies (step 1602). This determination may be made by running an algorithm that queries for changes to the enterprise environment. If no change has occurred, the process returns to step 1602. If a change has occurred, the administrator loads or updates the Critical Operations database (step 1604). Next, the administrator loads or updates the Historical database (step 1606). In a similar manner, the administrator then loads or updates the Access Control database (step 1608), the Connectivity database (step 1610), and the Threat database (step 1612).

Once the databases are updated, the administrator generates a Security Compliance view/report based on a comparison of the data in the Critical Operations, Historical, Access control, and Connectivity databases against similar security data elements from company or external policies (step 1614). Next, the administrator generates a Security Posture view/report by comparing the Security Compliance view/report against current threat element information in the Threat database (step 1616).

A Threat result view/report is produced by comparing elements in the Threat database against access elements in the Access Control database (step 1618). The administrator generates a Resource Exposure view/report by comparing a Threat result view/report against elements in the Connectivity database (step 1620), with the process terminating thereafter.

Thus, the present invention provides for real-time access to current security compliance information for the analysis of risks and their impact to business operations. The mechanism of the present invention allows access to an enterprise-wide view of security compliance and threat information for impact correlation. In addition, the present invention provides a focused threat impact correlation to critical business applications and operations. Using the present invention, business organizations may prioritize their mitigation and defense strategies regarding security threats and hacking attempts, as well as reduce security operations, analysis, and mitigation costs.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for determining a security posture of an enterprise, comprising:

responsive to an occurrence of an event in an enterprise environment, populating a first database with critical operations and mapping data, wherein the mapping data maps the critical operations to at least one of the group consisting of a supporting data center, a network infrastructure, a server, an application, and a security assessment tool;

populating a second database with historical data associated with the critical operations;

populating a third database with access control data associated with the critical operations, wherein the access control data comprises physical access data for the critical operations and logical device access data for the critical operations;

generating a security compliance view of the enterprise based on a comparison of data in the first database, second database, and third database to similar security data elements from company policies or external policies;

generating a security posture view by comparing the security compliance to threat data in a fourth database;

generating a threat result view by comparing threat data in the fourth database against the access control data in the third database, wherein generating the threat result view allows for determining an impact to enterprise operations if a threat is exploited;

generating a resource exposure view by comparing the threat result view against connectivity data in a fifth database, wherein the resource exposure view allows for determining other resources vulnerable to a threat;

determining from the security posture view whether the critical operations use a resource vulnerable to a current threat; and determining other vulnerable resources from the resource exposure view, the other vulnerable resources being impacted by vulnerabilities in the critical operations.

2. The method of claim 1, wherein the event is one of a request, or an external threat, or a change to the enterprise environment.

3. The method of claim 1, wherein determining the security posture of the enterprise allows for analyzing potential risks to business applications and operations.

4. The method of claim 3, wherein the potential risks to business applications and operations is shown in real-time.

5. The method of claim 1, wherein the populating steps are triggered when a change to identified elements in an internal or external enterprise environment is detected.

6. The method of claim 1, wherein the populating steps are triggered from a request to generate at least one of the security compliance view, security posture view, threat result view, and resource exposure view.

7. The method of claim 1, wherein an algorithm is used to assess current threats in the fourth database against the security compliance view to generate the security posture view.

* * * * *

UNITED STATES PATENT AND TRADEMARK OFFICE
CERTIFICATE OF CORRECTION

PATENT NO. : 7,657,942 B2  Page 1 of 1
APPLICATION NO. : 11/033436
DATED : February 2, 2010
INVENTOR(S) : Himberger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1424 days.

Signed and Sealed this

Thirtieth Day of November, 2010

David J. Kappos
*Director of the United States Patent and Trademark Office*